United States Patent
Jiang

(10) Patent No.: US 9,417,982 B2
(45) Date of Patent: Aug. 16, 2016

(54) METHOD AND APPARATUS FOR ISOLATING A FAULT IN A CONTROLLER AREA NETWORK

(71) Applicant: GM GLOBAL TECHNOLOGY OPERATIONS LLC, Detroit, MI (US)

(72) Inventor: Shengbing Jiang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 211 days.

(21) Appl. No.: 14/333,304

(22) Filed: Jul. 16, 2014

(65) Prior Publication Data

US 2015/0082078 A1    Mar. 19, 2015

Related U.S. Application Data

(60) Provisional application No. 61/878,538, filed on Sep. 16, 2013.

(51) Int. Cl.
| | |
|---|---|
| *G06F 11/00* | (2006.01) |
| *G06F 11/30* | (2006.01) |
| *G06F 11/07* | (2006.01) |
| *H04L 12/26* | (2006.01) |
| *H04L 12/40* | (2006.01) |

(52) U.S. Cl.
CPC .......... *G06F 11/3006* (2013.01); *G06F 11/079* (2013.01); *G06F 11/0739* (2013.01); *G06F 11/30* (2013.01); *H04L 12/40169* (2013.01); *H04L 43/0823* (2013.01); *H04L 2012/40215* (2013.01)

(58) Field of Classification Search
CPC ............ G06F 11/3006; G06F 11/0739; G06F 11/079; H04L 12/2419
See application file for complete search history.

(56) References Cited

U.S. PATENT DOCUMENTS

| | | | |
|---|---|---|---|
| 7,812,617 B2 | 10/2010 | Hofman | |
| 8,213,321 B2 | 7/2012 | Butts et al. | |
| 2011/0188371 A1 | 8/2011 | Brunnberg et al. | |
| 2012/0158240 A1 | 6/2012 | Downs, Jr. et al. | |
| 2013/0136007 A1 | 5/2013 | Jiang et al. | |
| 2013/0325203 A1 | 12/2013 | Lu | |
| 2014/0107885 A1* | 4/2014 | Hagen | G07C 5/008 701/29.4 |
| 2014/0149801 A1* | 5/2014 | Jiang | G06F 11/2005 714/43 |
| 2015/0082089 A1* | 3/2015 | Jiang | G06F 11/3048 714/25 |
| 2015/0082096 A1* | 3/2015 | Jiang | G06F 11/3006 714/37 |
| 2015/0113328 A1* | 4/2015 | Jiang | G06F 11/079 714/37 |

* cited by examiner

*Primary Examiner* — Philip Guyton

(57) ABSTRACT

A controller area network (CAN) includes a plurality of CAN elements comprising a communication bus and a plurality of controllers. A method for monitoring includes periodically determining vectors wherein each vector includes inactive ones of the controllers detected during a filtering window. Contents of the periodically determined vectors are time-filtered to determine a fault record vector. A fault on the CAN is isolated by comparing the fault record vector and a fault signature vector determined based upon a network topology for the CAN.

19 Claims, 5 Drawing Sheets

METHOD AND APPARATUS FOR ISOLATING A FAULT IN A CONTROLLER AREA NETWORK

CROSS REFERENCE TO RELATED APPLICATIONS

This application claims the benefit of U.S. Provisional Application No. 61/878,538 filed on Sep. 16, 2013, which is incorporated herein by reference.

TECHNICAL FIELD

This disclosure relates to communications in controller area networks, and fault isolation associated therewith.

BACKGROUND

The statements in this section merely provide background information related to the present disclosure. Accordingly, such statements are not intended to constitute an admission of prior art.

Vehicle systems include a plurality of subsystems, including by way of example, engine, transmission, ride/handling, braking, HVAC, and occupant protection. Multiple controllers may be employed to monitor and control operation of the subsystems. The controllers can be configured to communicate via a controller area network (CAN) to coordinate operation of the vehicle in response to operator commands, vehicle operating states, and external conditions. A fault can occur in one of the controllers that affects communications via a CAN bus.

Known CAN systems employ a bus topology for the communication connection among all the controllers that can include a linear topology, a star topology, or a combination of star and linear topologies. Known high-speed CAN systems employ linear topology, whereas known low-speed CAN systems employ a combination of the star and linear topologies. Known CAN systems employ separate power and ground topologies for the power and ground lines to all the controllers. Known controllers communicate with each other through messages that are sent at different periods on the CAN bus. Topology of a network such as a CAN refers to an arrangement of elements. A physical topology describes arrangement or layout of physical elements including links and nodes. A logical topology describes flow of data messages or power within a network between nodes employing links.

Known systems detect faults at a message-receiving controller, with fault detection accomplished for the message using signal supervision and signal time-out monitoring at an interaction layer of the controller. Faults can be reported as a loss of communications. Such detection systems generally are unable to identify a root cause of a fault, and are unable to distinguish transient and intermittent faults. One known system requires separate monitoring hardware and dimensional details of physical topology of a network to monitor and detect communications faults in the network.

SUMMARY

A controller area network (CAN) includes a plurality of CAN elements including a communication bus and a plurality of controllers. A method for monitoring the CAN includes periodically determining vectors wherein each vector includes inactive ones of the controllers detected during a filtering window. Contents of the periodically determined vectors are time-filtered to determine a fault record vector. A fault on the CAN is isolated by comparing the fault record vector and a fault signature vector determined based upon a network topology for the CAN.

BRIEF DESCRIPTION OF THE DRAWINGS

One or more embodiments will now be described, by way of example, with reference to the accompanying drawings, in which.

DETAILED DESCRIPTION

Figure 1:
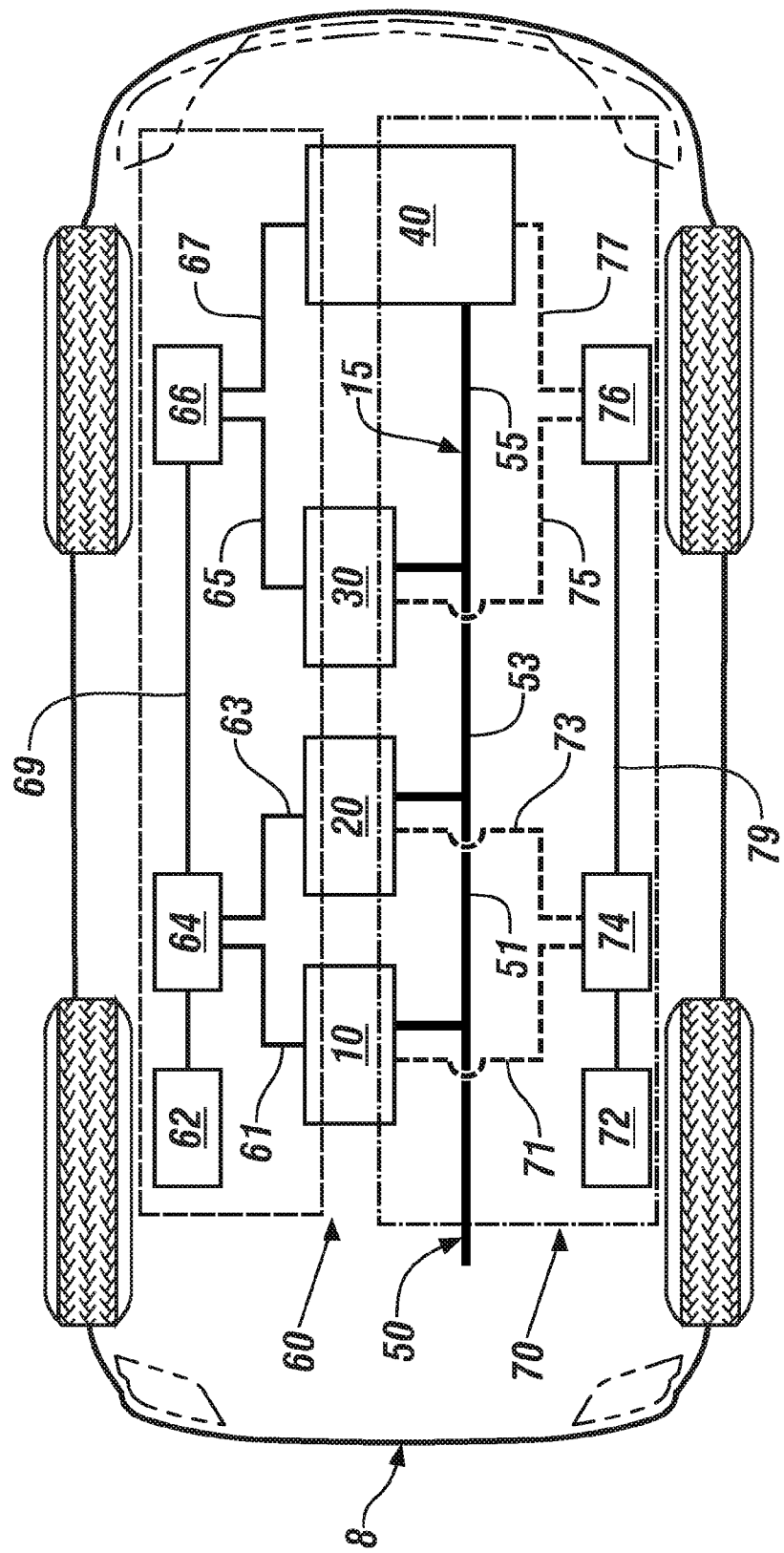
FIG. 1 illustrates a vehicle including a controller area network (CAN) with a CAN bus and a plurality of nodes, e.g., controllers, in accordance with the disclosure.

Referring now to the drawings, wherein the showings are for the purpose of illustrating certain exemplary embodiments only and not for the purpose of limiting the same, FIG. 1 schematically illustrates a vehicle 8 including a controller area network (CAN) 50 including a CAN bus 15 and a plurality of nodes, i.e., controllers 10, 20, 30 and 40. The term "node" refers to any active electronic device that signally connects to the CAN bus 15 and is capable of sending, receiving, or forwarding information over the CAN bus 15. Each of the controllers 10, 20, 30 and 40 signally connects to the CAN bus 15 and electrically connects to a power grid 60 and a ground grid 70. Each of the controllers 10, 20, 30 and 40 includes an electronic controller or other on-vehicle device configured to monitor or control operation of a subsystem of the vehicle 8 and communicate via the CAN bus 15. In one embodiment, one of the controllers, e.g., controller 40 is configured to monitor the CAN 50 and the CAN bus 15, and may be referred to herein as a CAN controller or a monitor. The illustrated embodiment of the CAN 50 is a non-limiting example of a CAN, which may be employed in any of a plurality of system configurations.

The CAN bus 15 includes a plurality of communications links, including a first communications link 51 between controllers 10 and 20, a second link communications 53 between controllers 20 and 30, and a third communications link 55 between controllers 30 and 40. The power grid 60 includes a power supply 62, e.g., a battery that electrically connects to a first power bus 64 and a second power bus 66 to provide electric power to the controllers 10, 20, 30 and 40 via power links. As shown, the power supply 62 connects to the first power bus 64 and the second power bus 66 via power links that are arranged in a series configuration, with power link 69 connecting the first and second power buses 64 and 66. The first power bus 64 connects to the controllers 10 and 20 via power links that are arranged in a star configuration, with power link 61 connecting the first power bus 64 and the controller 10 and power link 63 connecting the first power bus 64 to the controller 20. The second power bus 66 connects to the controllers 30 and 40 via power links that are arranged in a star configuration, with power link 65 connecting the second power bus 66 and the controller 30 and power link 67 connecting the second power bus 66 to the controller 40. The ground grid 70 includes a vehicle ground 72 that connects to a first ground bus 74 and a second ground bus 76 to provide electric ground to the controllers 10, 20, 30 and 40 via ground links. As shown, the vehicle ground 72 connects to the first ground bus 74 and the second ground bus 76 via ground links that are arranged in a series configuration, with ground link 79 connecting the first and second ground buses 74 and 76. The first ground bus 74 connects to the controllers 10 and 20 via ground links that are arranged in a star configuration, with ground link 71 connecting the first ground bus 74 and the controller 10 and ground link 73 connecting the first ground bus 74 to the controller 20. The second ground bus 76 connects to the controllers 30 and 40 via ground links that are arranged in a star configuration, with ground link 75 connecting the second ground bus 76 and the controller 30 and ground link 77 connecting the second ground bus 76 to the controller 40. Other topologies for distribution of communications, power, and ground for the controllers 10, 20, 30 and 40 and the CAN bus 15 can be employed with similar effect.

Control module, module, control, controller, control unit, ECU, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Each of the controllers 10, 20, 30 and 40 transmits and receives messages across the CAN 50 via the CAN bus 15, with message transmission rates occurring at different periods for different ones of the controllers. A CAN message has a known, predetermined format that includes, in one embodiment, a start of frame (SOF), an identifier (11-bit identifier), a single remote transmission request (RTR), a dominant single identifier extension (IDE), a reserve bit (r0), a 4-bit data length code (DLC), up to 64 bits of data (DATA), a 16-bit cyclic redundancy check (CDC), 2-bit acknowledgement (ACK), a 7-bit end-of-frame (EOF) and a 3-bit interframe space (IFS). A CAN message can be corrupted, with known errors including stuff errors, form errors, ACK errors, bit 1 errors, bit 0 errors, and CRC errors. The errors are used to generate an error warning status including one of an error-active status, an error-passive status, and a bus-off error status. The error-active status, error-passive status, and bus-off error status are assigned based upon increasing quantity of detected bus error frames, i.e., an increasing bus error count. Known CAN bus protocols include providing network-wide data consistency, which can lead to globalization of local errors. This permits a faulty, non-silent controller to corrupt a message on the CAN bus 15 that originated at another of the controllers. A faulty, non-silent controller is referred to herein as a fault-active controller.

Figure 2:
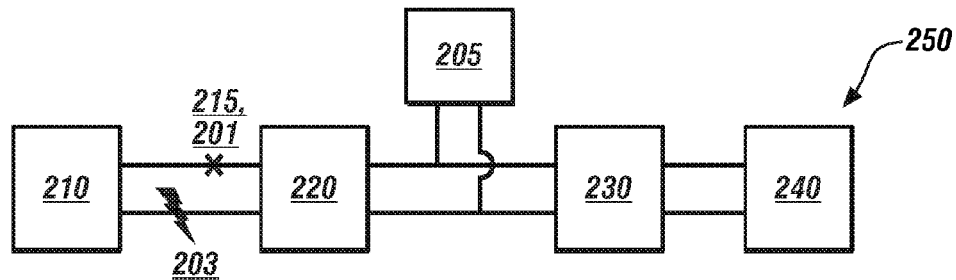
FIG. 2 illustrates an integrated controller area network that is analogous to the CAN of FIG. 1, including a CAN bus having wire cables, a plurality of nodes, e.g., controllers, and a data link control, in accordance with the disclosure.

FIG. 2 schematically illustrates an integrated controller area network 250 that is analogous to the CAN 50 shown with reference to FIG. 1, including a CAN bus 215 including wire cables 201 and 203, a plurality of nodes, e.g., controllers 210, 220, 230 and 240, and data link connector (DLC) 205. When there is an open-wire fault on one of the wire cables, e.g., on wire cable 201 between controller 210 and 220, controller 210 disturbs bus communications of controllers 220, 230 and 240 through wire cable 203. This can cause the controllers 220, 230 and 240 to enter a bus-off state and be detected as inactive nodes. However, controller 210 may not enter the bus-off state.

Figure 3:
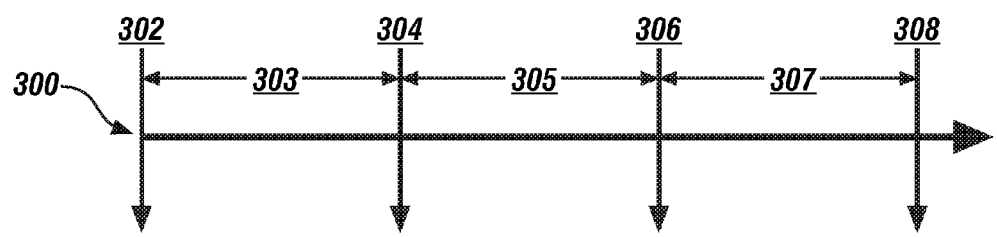
FIG. 3 illustrates a timeline that includes a plurality of time-sequential events that are separated by filtering windows and associated with data filtering to determine a correct signature fault in a CAN, in accordance with the disclosure.

FIG. 3 schematically illustrates a timeline 300 that includes a plurality of time-sequential events 302, 304, 306 and 308 that are separated by filtering windows 303, 305 and 307. The timeline 300 is associated with data filtering to determine a correct fault symptom in an exemplary CAN. The elapsed filtering time for the filtering windows 303, 305 and 307 is selected in accordance with the following relationship:

$$\text{Max}\{Th_i, i=1,\ldots,N\}+2*\text{Busoff\_Reset\_Delay} \quad [1]$$

wherein $Th_i$ is the time-out value for the active supervision of controller $ECU_i, i=1,\ldots,n$, and is calibratable, Busoff_Reset_Delay is a calibratable value (160 ms by default), and $ECU_i$ represents individual ones of the controllers linked to the CAN bus, e.g., controllers 210, 220, 230 and 240 linked to CAN 215 as shown with reference to FIG. 1.

This process for selecting the elapsed filtering time is employed to ensure that a normally operating controller (ECU) subjected to an outside disturbance causing a communications fault has an opportunity to recover from a bus-off state induced by the disturbance. As shown, event 302 is an initial event, which is followed by filtering window 303. At event 304, one of the controllers is detected as inactive when it has not been active for the entire period of the previous filtering window 303. A controller is considered active when it sends a CAN message, and inactive when it fails to send a CAN message during a filtering window. At event 306 following filtering window 305, it is determined whether there is any newly inactive controller. If so, fault detection and analysis are delayed until the end of the subsequent filtering window 307. At event 308, if one of the previously inactive controllers recovers from inactive state and reactivates, the filtering window expands to include the previous window and the current window for controller inactive detection prior to executing fault detection. Thus, the filtering window can be selected as described with reference to EQ. [1] to include a controller that goes inactive due to an external event such as a single wire open fault as described with reference to FIG. 2.

A communications fault leading to a lost CAN message on the CAN bus can be the result of a fault in one of the controllers, a fault in one of the communications links of the CAN bus, a fault in one of the power links of the power grid, or a fault in one of the ground links of the ground grid. Topology graphs can be developed, including a communications topology, a power topology and a ground topology. A reachability analysis is conducted for each of the topology graphs with an open link removed. One embodiment of a reachability analysis of a topology graph is described as follows with reference to FIG. 4.

Figure 4:
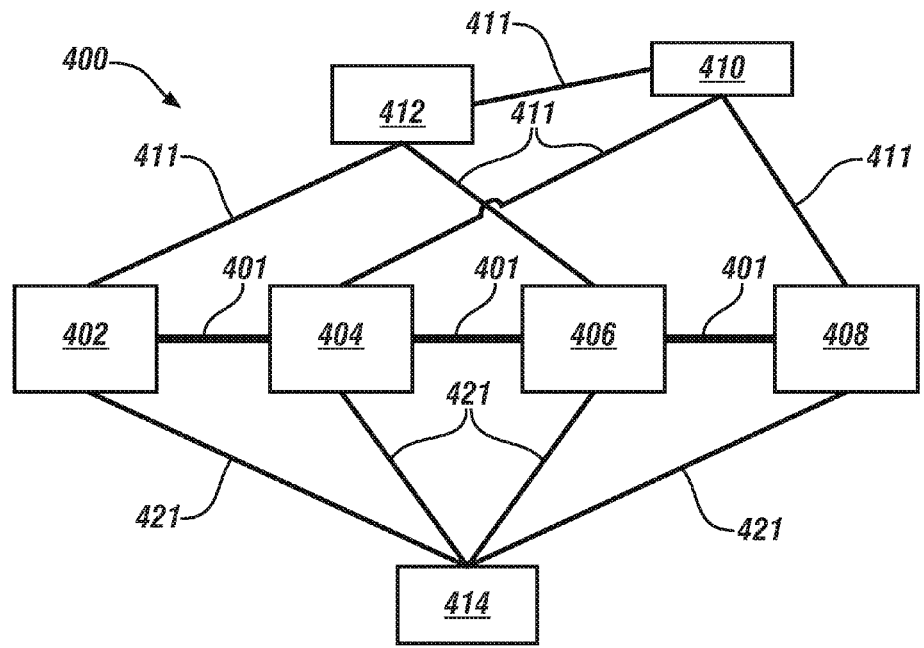
FIG. 4 illustrates an exemplary CAN including controllers, monitoring controller, power supply, battery star and ground, each connected via a link, in accordance with the disclosure.

FIG. 4 illustrates a network topology for an exemplary CAN 400 including controllers ECU1 402, ECU2 404 and ECU3 406, monitoring controller (monitor) 408, power supply 410, battery star 412 and ground 414, which are connected via communications links 401, power links 411, and ground links 421 as shown. The monitor 408 observes symptoms that indicate various fault sets, with each fault set having a corresponding fault signature that includes a set of inactive controllers. The monitoring function is shown as being executed by monitor 408, but it is understood that any of or all of the controllers ECU1 402, ECU2 404, ECU3 406 and monitor 408 on the communications bus can be configured to execute a fault diagnosis since any message on the CAN bus can be observed at any of and all of the controller nodes.

A fault model is generated for the network topology and includes a plurality of symptoms observed by the monitoring controller for each of a plurality of faults and a corresponding plurality of fault signature vectors $V_f^{inactive}$. Each of the fault signature vectors $V_f^{inactive}$ includes a set of observed inactive controller(s) associated therewith. An exemplary fault model associated with the network topology depicted with reference to FIG. 4 includes the following with reference to Table 1, wherein the network topology for the CAN 400 includes controllers 402 [ECU1], 404 [ECU2] and 406 [ECU3], monitor 408 [ECU$_M$], power supply 410 [PS], battery star 412 [BS] and ground 414 [G]. The fault model is derived employing a reachability analysis of the network topology wherein symptoms are individually induced and communications are monitored to determine which of the controllers is inactive for each symptom.

TABLE 1

| Fault Set | Symptom | Inactive Controllers in Fault signature vector $V_f^{inactive}$ |
|---|---|---|
| f1 | Open Link [ECU1]-[ECU2]<br>Open Link [ECU1]-[PS]<br>Open Link [ECU1]-[G]<br>[ECU1] Fault | [ECU1] |
| f2 | Open Link [ECU2]-[PS]<br>Open Link [ECU2]-[G]<br>[ECU2] Fault | [ECU2] |
| f3 | Open Link [ECU3]-[BS]<br>Open Link [ECU3]-[G]<br>[ECU3] Fault | [ECU3] |
| f4 | Open Link [ECU2]-[ECU3] | [ECU1], [ECU2] |
| f5 | Open Link [PS]-[BS] | [ECU1], [ECU3] |
| f6 | Open Link [ECU1]-[ECU2]<br>CAN bus wire short | [ECU1], [ECU2], [ECU3] |

A first fault set f1 can include a symptom of an open power link 411 between one of ECU1 402 and battery star 412, an open ground link 421 between ECU1 402 and ground 414, an open communications link 401 between ECU1 402 and ECU2 404, and a fault with ECU1 402, with a corresponding fault signature vector $V_f^{inactive}$ including ECU1 402 as inactive. A second fault set f2 can include a symptom of an open power link 411 between ECU2 404 and battery 410, an open ground link 421 between ECU2 404 and ground 414, and a fault with ECU2 404, with a corresponding fault signature vector $V_f^{inactive}$ including ECU2 404 as inactive. A third fault set f3 can include a symptom of an open power link 411 between one of ECU3 406 and battery star 412, an open ground link 421 between ECU3 406 and ground 414, and a fault with ECU3 406 with a corresponding fault signature vector $V_f^{inactive}$ including ECU3 406 as inactive. A fourth fault set f4 can include a symptom of an open communications link 401 between ECU2 404 and ECU3 406 with a corresponding fault signature vector $V_f^{inactive}$ including ECU1 402 and ECU2 404 as inactive. A fifth fault set f5 can include a symptom of an open power link 411 between battery 410 and battery star 412 with a corresponding fault signature vector $V_f^{inactive}$ including ECU1 402 and ECU3 406 as inactive. A sixth fault set f6 can include a symptom of an open communications link 401 between monitor 408 and ECU3 406 with a corresponding fault signature vector $V_f^{inactive}$ including ECU1 402, ECU2 404 and ECU3 406 as inactive. Other fault signature vectors $V_f^{inactive}$ may be developed in accordance with a specific architecture of a CAN system employing a reachability analysis of a topology graph of the CAN. The monitoring function including fault diagnosis can be executed in any of or all of the controllers ECU1 402, ECU2 404, ECU3 406 and monitor 408 to identify fault(s) in the communications links 401, power links 411 and ground links 421 and identify inactive controller(s), if any. This allows development of suitable fault sets and symptoms and corresponding fault signature vectors $V_f^{inactive}$ to isolate to a single actionable fault in the CAN.

A CAN monitoring routine 500 executes fault detection and isolation by generating a system model that includes $V_{ECU}$, which represents a set of controllers in the CAN including one or more monitoring nodes that can include one or a plurality of the controllers and/or a monitoring controller. Each of the controllers transmits a set of messages that may have different periods or repetition rates. Topology graphs, e.g., as shown with reference to FIG. 4 include topologies $G_{bus}$, $G_{bat}$, and $G_{grid}$ of the communications bus, the power bus and the ground bus, respectively. A fault set F can include each controller node fault, each bus link open fault, each power link open fault, each ground link open fault and other faults for the topology graphs. A pre-operation exercise generates a fault signature vector $V_f^{inactive}$ composed of a set of inactive controllers associated with each fault f for each fault f in the fault set F. The fault signature vectors $V_f^{inactive}$ are employed to isolate a fault.

Figure 5:
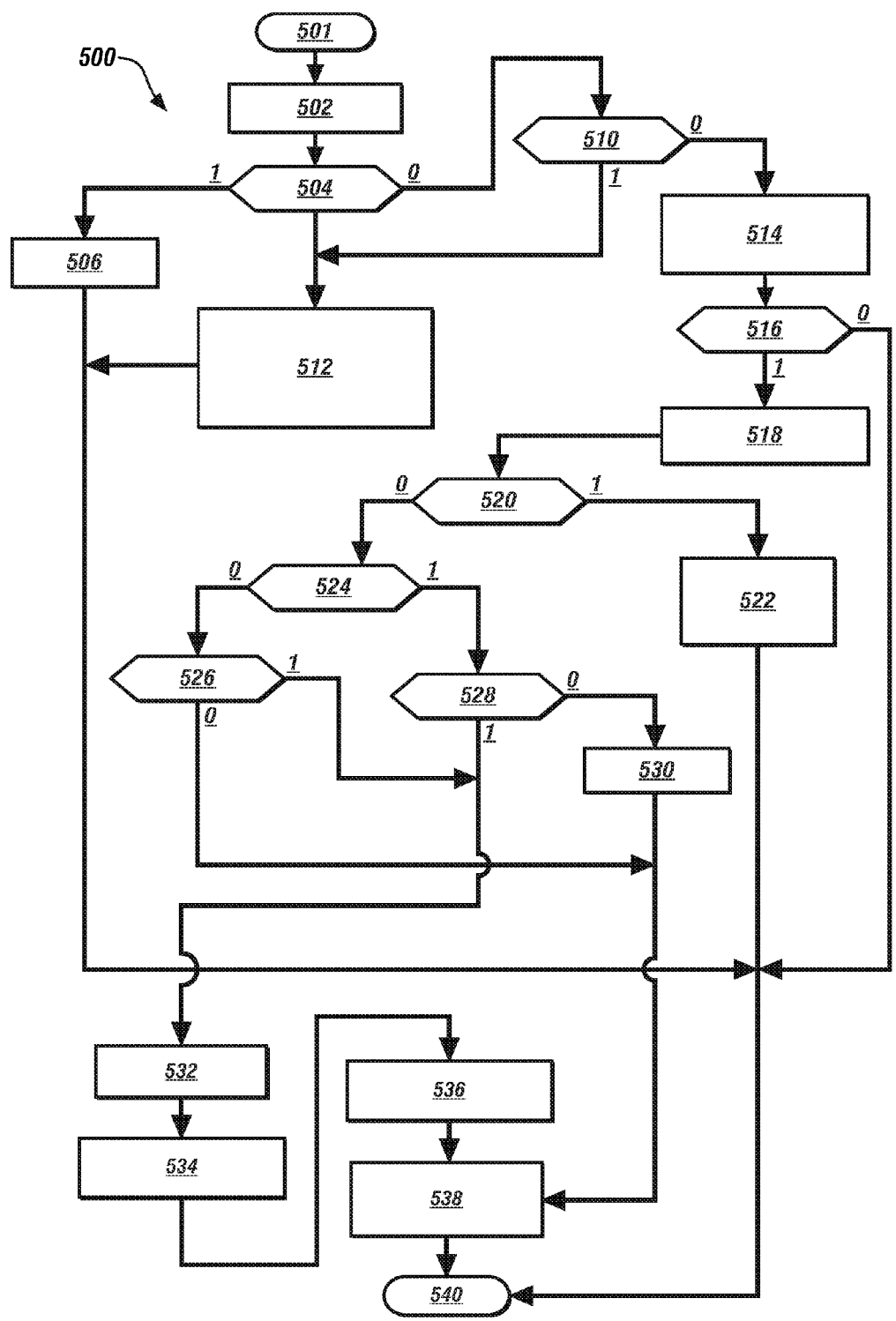
FIG. 5 illustrates a CAN monitoring routine that employs data filtering to detect and isolate a communications fault in a CAN, in accordance with the disclosure.

FIG. 5 schematically illustrates the CAN monitoring routine 500 that employs data filtering to obtain the correct fault symptoms whether or not there are error frames on the bus, and performs fault isolation based on the correct fault symptoms and the system topology to detect and isolate a communications fault in a CAN. The CAN monitoring routine 500 is periodically executed as described herein. Table 2 is provided as a key to routine 500 of FIG. 5, wherein the numerically labeled blocks and the corresponding functions are set forth as follows.

TABLE 2

| BLOCK | BLOCK CONTENTS |
|---|---|
| 501 | Start |
| 502 | Execute controller active supervision routine |
| 504 | Active[i] =1 for all non-sleeping ECU_i? |
| 506 | Set Diagnostic Trigger = 0 |
| 510 | Is Diagnostic Trigger = 0? |
| 512 | Initialize for diagnostic<br>Set Diagnostic Trigger = 1;<br>Set N_Cycle=0; |

TABLE 2-continued

| BLOCK | BLOCK CONTENTS |
|---|---|
|  | Set Fault_num=0; |
|  | Set F_flag1 = 0; |
|  | Set F_flag2=0; |
|  | Set vector C_Inactive = {ECU_i:Sleep[i]=0}; |
|  | Set Active[i]=0 for all ECU_i; |
|  | Set vector P_Inactive = empty |
| 514 | N_Cycle = N_Cycle+1: |
|  | Set vector C_Inactive = vector C_Inactive −{ECU_i: Active[i]=1 }; |
| 516 | Is N_Cycle ≥ C_Th? |
| 518 | Set N_Cycle = 0; |
|  | Set Active[i] = 0 for all ECU_i |
| 520 | Is any ECU in vector P_Inactive but not in vector C_Inactive? |
| 522 | Set vector C_Inactive = only those ECUs that are members of both vector C_Inactive and vector P_Inactive; |
|  | Empty vector P_Inactive; |
|  | Set Fault_num = 0 |
|  | Set F_Flag1 = 1; Set F_Flag2 = 0 |
| 524 | Is any ECU not in vector P_Inactive but in vector C_Inactive? |
| 526 | Is F_Flag2 = 1? |
| 528 | Is F_Flag1 = 1? |
| 530 | Set F_Flag2 = 1 |
| 532 | Set F_Flag1 = 0 |
|  | Set F_Flag2 = 0 |
|  | Increment Fault_Num: Fault_Num =Fault_Num +1 |
| 534 | Set R_Inactive[Fault_num]=vector C_Inactive |
|  | Set R_Sleep[Fault_num][i] = Sleep[i] for all ECU_i |
| 536 | Execute Fault Isolation Routine |
| 538 | Set vector P_Inactive = vector C_Inactive |
|  | vector C_Inactive = {ECU_i: Sleep[i]=0} |
| 540 | End |

Calibratable parameters associated with execution of the CAN monitoring routine 500 include the following:

$T_d$, which is the execution interval of the CAN monitoring routine 500, having a default value of 100 ms in one embodiment, and is preferably always less than a reset delay associated with a bus-off event (BusOff_Reset_Delay), which is a calibratable value with a default value of 160 ms;

N, which is the total quantity of controllers (ECUs) in the CAN;

C_Th, which is a threshold for the number of cycles that is the time window for diagnosis associated with a current iteration of the routine, having default value in accordance with the following relationship:

$$(2*BusOff\_Reset\_Delay+\max\{Th_i, i=1,\ldots,N\})/T_d$$

wherein $Th_i$ is the time-out value for the active supervision of $ECU_i$, i=1, . . . , N, and calibratable, and is $Th_i$=max{2.5*(supervision message period of $ECU_i$), 250 ms};

vector C_Inactive refers to the set of all controllers that have remained inactive during the current iteration of the routine; and vector P_Inactive refers to the set of all controllers that remained inactive during the previous iteration of the routine.

Upon starting execution of the current iteration (501), a controller active supervision routine is called to obtain controller active reports for the relevant controllers (502). One embodiment of a controller active supervision routine is described herein with reference to FIG. 6. The controller active reports are evaluated (504), and when all controllers are active (504)(1), the diagnostic trigger Diag_trigger is set equal to 0 (506) and the current iteration ends (540). When not all the controllers are active (504)(0), the diagnostic trigger is checked to determine whether it is zero (Is Diag_trigger=0?) (510). When the diagnostic trigger is zero (510)(1), a plurality of variables are initialized as follows (512):

| |
|---|
| Set Diagnostic Trigger = 1; |
| Set N_Cycle=0; |
| Set Fault_num=0; |
| Set F_flag1 = 0; |
| Set F_flag2=0; |
| vector C_Inactive = {ECU_i:Sleep[i]=0}; |
| Set Active[i]=0 for all ECU_i; and |
| Set P_Inactive = empty. |

The current iteration then ends (540).

When the diagnostic trigger is non-zero (510)(0), a cycle counter N_Cycle is incremented by 1, and the vector C_Inactive is updated by removing any active controllers (514).

The cycle counter N_Cycle is evaluated to determine whether it has reached a counter threshold C_Th (516). When the cycle counter N_Cycle has not reached the counter threshold C_Th (516)(0), the present iteration ends (540).

When the cycle counter N_Cycle has reached the counter threshold C_Th (516)(1), the cycle counter N_Cycle is reset to zero, and the active indicator Active[i] is reset to zero for all the controllers (518).

The system determines whether any of the controllers that remained not active before the last N_Cycle reset now becomes active, i.e., whether any controller is contained in vector P_Inactive but not contained in vector C_Inactive (520). If so (520)(1), then terms are set as follows: The vector C_Inactive becomes a logic intersection of only the controllers contained in both vector C_Inactive and vector P_Inactive. The following terms are set as follows (522):

| |
|---|
| vector P_Inactive =empty; |
| Fault_num=0; |
| F_Flag1=1; and |
| F_Flag2=0. |

The current iteration then ends (540). If not (520)(0), the system checks to determine whether any controller that was active before the last N_Cycle reset now remains not active, i.e., whether any controller is not contained in vector P_Inactive but is contained in vector C_Inactive (524). If not (524)(0), the value of F_Flag2 is checked to determine whether it is equal to 1 (526). If not (526)(0), the vector P_Inactive is updated to include the contents of C_Inactive, and the vector C_Inactive is updated to include all currently non-sleep controllers (538), and the current iteration ends (540). If so (524)(1), the value of F_Flag1 is checked to determine whether it is equal to 1 (528). When F_Flag1 is not 1 (528)(0), F_Flag2 is set to 1 (530). The vector P_Inactive is updated to include the contents of vector C_Inactive, and the vector C_Inactive is updated to include all currently non-sleep controllers (538), and the current iteration ends (540). The variables F_Flag1 and F_Flag2 are employ to delay diagnosis of a fault for C_Th cycles to allow the effects of any such fault to be fully manifested. If F_Flag1 is 1 (528)(1), F_Flag1 is reset to zero, F_Flag2 is reset to zero, the fault counter Fault_num is incremented (532). All currently known fault information is stored for fault diagnosis, which includes generating a fault record vector as follows:

| |
|---|
| R_Inactive[Fault_num] = vector C_Inactive and |
| R_Sleep[Fault_Num][i]=Sleep[i] for all ECU_i (534). |

The fault diagnosis is executed by calling a fault isolation routine (536), an embodiment of which is described with reference to FIG. 7, after which the current iteration ends (540).

When F_Flag2 is equal to 1 (526)(1), the routine progresses, including F_Flag1 is reset to zero, F_Flag2 is reset to zero, the fault counter Fault_num is incremented (532). All currently known fault information is stored for fault diagnosis. When F_Flag2 is not equal to 1 (526)(0), the vector P_Inactive is updated to include the contents of vector C_Inactive, and the vector C_Inactive is updated to include all currently non-sleeping controllers (538), and the current iteration ends (540).

Figure 6:
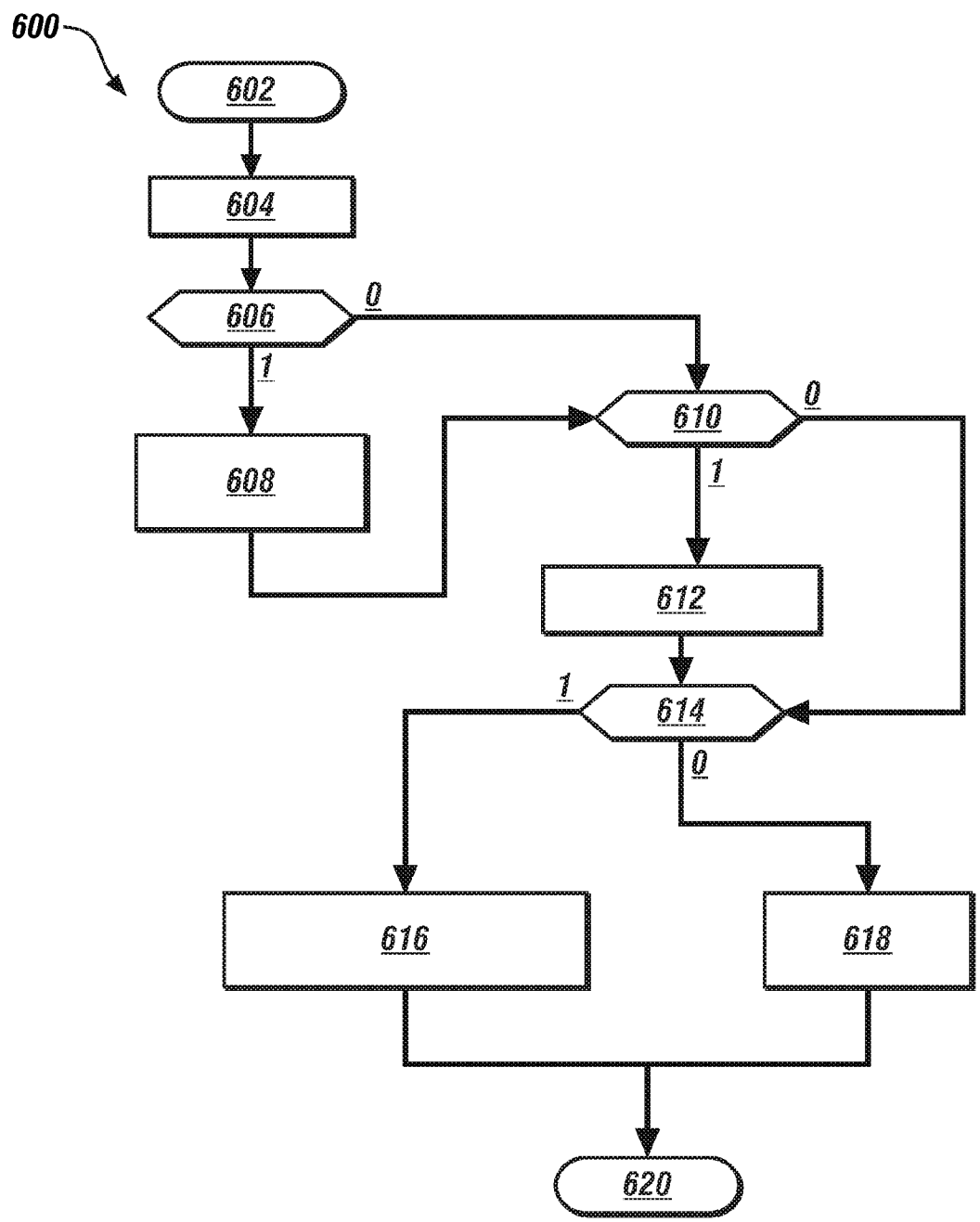
FIG. 6 illustrates a controller active supervision routine to monitor controller status including detecting whether one of the controllers connected to the CAN bus is inactive, in accordance with the disclosure.

FIG. 6 schematically illustrates the controller active supervision routine 600 to monitor controller status including detecting whether one of the controllers connected to the CAN bus is inactive. The controller active supervision routine 600 is executed to obtain controller-active reports based upon monitoring communications originating from the controllers in the CAN. Table 3 is provided as a key to the controller active supervision routine 600 of FIG. 6, wherein the numerically labeled blocks and the corresponding functions are set forth as follows.

TABLE 3

| BLOCK | BLOCK CONTENTS |
|---|---|
| 602 | Initialize terms |
| 604 | Set Ti = Ti − 1 if Ti > 0 for any Ti |
| 606 | Query ECUs—has a new message been received from ECU_i? |
| 608 | Set Active[i] = 1 Reset Ti = Thi/Td |
| 610 | Is $T_i$ = 0 for any ECU_i? |
| 612 | Set Active[i] = 0 for all such ECU_i |
| 614 | Is any ECU_i not participating in any active partial network? |
| 616 | Set Active[i] = 0 Set Sleep[i] = 1 |
| 618 | Set Sleep]i] = 0 |
| 620 | Return |

Upon the first time execution of the controller active supervision routine 600 (602) in each ignition cycle, a time-out value Ti for active supervision of ECU_i initializes in accordance with the following relationship:

$$Ti = Th_i/T_d \quad [2]$$

wherein i designates a specific ECU_i, with i=1, . . . , N,
N designates the total quantity of controllers in the CAN,
$Th_i$ is a calibratable time-out value for active supervision of ECU_i, and
$T_d$ is the execution period of the main routine, i.e., CAN monitoring routine 500.
Other initialized terms include flags for each of the i=1, . . . , N controllers, which are set as follows:

Active[i] = 0, and
Sleep[i] = 0.

Thus, the controllers are neither designated as being in the Active state or the Sleep state at the beginning of first execution of this routine in each ignition cycle.

The time-out value Ti is decremented by 1, i.e., Ti=Ti−1 if Ti is greater than one for any i (604), and the system monitors to determine whether any new message has been received from any of the controllers (606). If so (606)(1), the active flag Active[i] is set (=1) for the specific ECU_i from which a message has been received and the time-out value Ti is re-initialized, as described with reference to EQ. [2] (608). In continuation, or if no new message has been received from any of the controllers (606)(0), the time-out value Ti is evaluated to determine if it has achieved a value of zero for any of the controllers (610), and if so (610)(1), the active flag Active [i] is reset (=0) for any specific controller ECU_i from which a message has not been received (612). If not (610)(0), or subsequent to resetting the active flags Active[i] as described, it is determined whether any of the controllers ECU_i has not participated in any active partial network (614), and if so (614)(1), the active flag Active[i] is reset to 0 and the sleep flag Sleep[i] is set to 1 (616). Otherwise (614)(0), the sleep flag Sleep[i] is reset to 0 (618), and this iteration ends (620) with the results returned to the controller active supervision routine 600.

Figure 7:
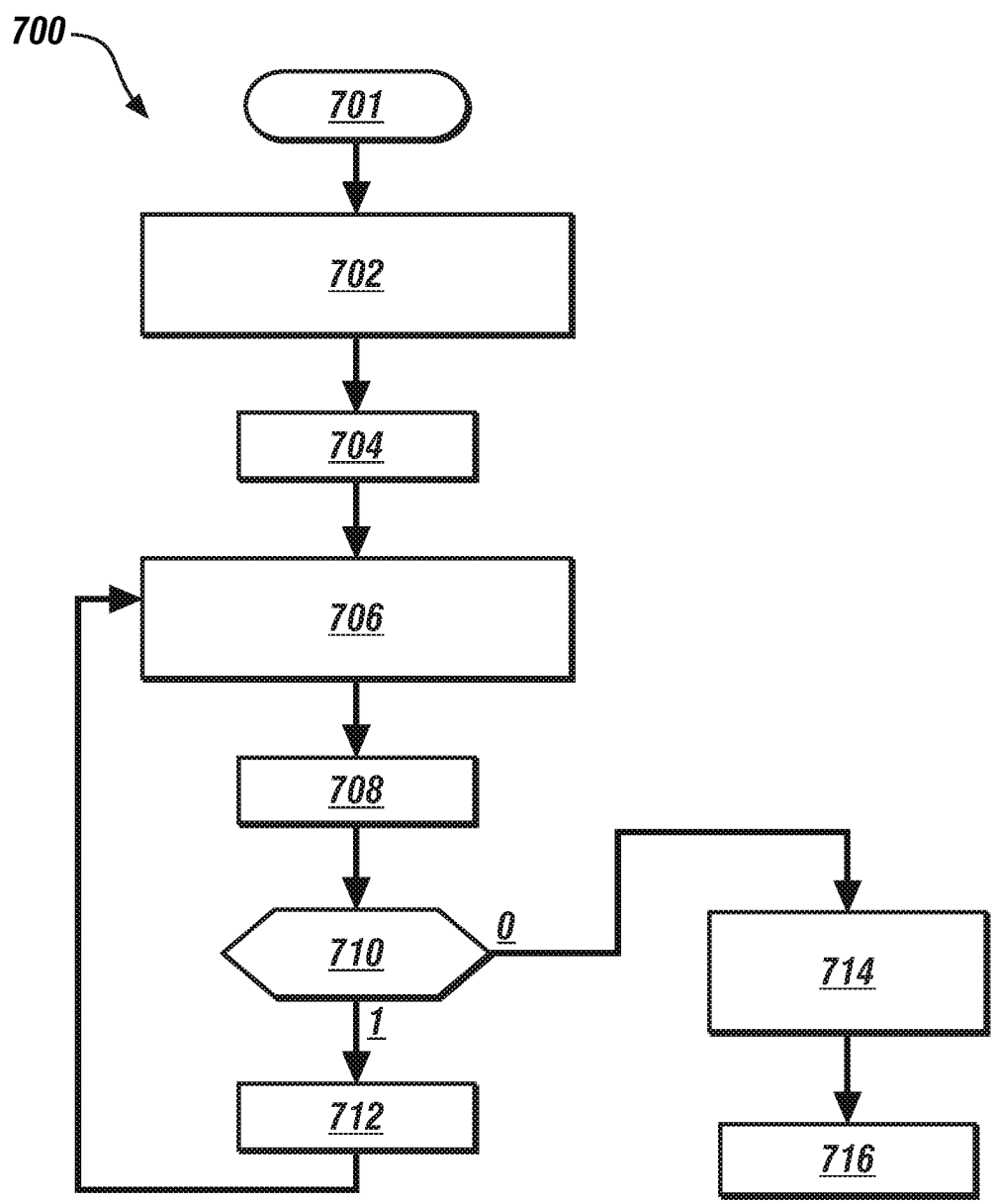
FIG. 7 illustrates a fault isolation routine to determine fault candidates, i.e., open links, wire shorts, or faulty controllers employing fault signature vectors, in accordance with the disclosure.

FIG. 7 illustrates an embodiment of a fault isolation routine 700 to determine fault candidates, i.e., open links, wire shorts, or faulty controllers employing fault signature vectors $V_f^{inactive}$ examples of which are described with reference to FIG. 4. Table 4 is provided as a key to the fault isolation routine 700 of FIG. 7, wherein the numerically labeled blocks and the corresponding functions are set forth as follows.

TABLE 4

| BLOCK | BLOCK CONTENTS |
|---|---|
| 701 | Initialize FC is empty Pre_FC is empty |
| 702 | Obtain fault information from CAN monitoring routine Fault_num R_Inactive[k] R_Sleep[k][i] for all ECU_i k=1,...,Fault_num i=1,...,N |
| 704 | k=1 |
| 706 | FC={S ⊆ F: \|S\|≥k and it is the smallest such that R_Inactive[k] = $(U_{f \in S} V_f^{inactive}) \cap$ {ECU_i : R_Sleep[k][i]=0}, and if k>1 then ∀ R ∈ Pre_FC, R ⊆ S} |
| 708 | Pre_FC=FC |
| 710 | Is k<Fault_num? |
| 712 | k=k+1 |
| 714 | Output FC as the set of fault candidates |
| 716 | Return |

The fault isolation routine 700 initializes terms, including emptying a fault candidate vector FC and a previous fault candidate vector pre-FC (701). Fault information from the CAN monitoring routine 500 is retrieved, including the fault record vector R_Inactive[Fault_num], the recorded fault number (Fault_num) and recorded inactive and sleeping controllers, as follows (702):

R_Inactive[k]
R_Sleep[k][i] for all ECU_i
k=1,...,Fault_num
i=1,...,N

Furthermore, a system topology evaluation determines the fault signature vector $V_f^{inactive}$ for each fault f to indicate the corresponding set of inactive controllers. The fault index k is initialized to 1 (704). The routine determines for each fault index k, a fault candidate as a subset S of F such that S is the smallest (measured by size) among the sets with \|S\|≥k that satisfies the following relationships:

$$R\_Inactive[k] = (\cup_{f \in S} V_f^{inactive}) \cap \{ECU\_i: R\_Sleep[k][i]=0\},$$
and if k>1, then $\forall$ R $\in$ Pre_FC, R $\subseteq$ S Thus, those non-sleep controllers in the fault candidate's signature set shall be inactive, other non-sleep controllers not in the fault candidate's signature set shall be active, and any previous fault candidate shall be a part of the current fault candidate set when another fault has occurred (i.e., k>1) (706).

The Pre_FC set is set equal to the current FC set (708), and the system is queried to determine whether all the faults have been evaluated (Is k<Fault_num?) (710). If all the faults have not been evaluated (710)(0), the fault index k is incremented (k=k+1) (712) and operation continues by executing blocks 706 and 708 for the incremented fault index k.

In this manner, the controller(s) contained in the fault record vector is compared to the controller(s) contained in all the fault signature vectors $V_f^{inactive}$ to identify and isolate the fault based upon correspondence with one of the fault signature vectors $V_f^{inactive}$.

When all the faults have been evaluated (710)(1), the fault candidate set FC is output to the CAN monitoring routine 500 (714) and this iteration of the fault isolation routine 700 ends (716), returning operation to the CAN monitoring routine 500.

CAN systems are employed to effect signal communications between controllers in a system, e.g., a vehicle. The fault isolation process described herein permits location and isolation of a single fault, multiple faults, and intermittent faults in the CAN systems, including faults in a communications bus, a power supply and a ground.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring a controller area network (CAN) including a plurality of CAN elements comprising a communication bus and a plurality of controllers, comprising:
   periodically determining vectors, each vector comprising inactive ones of the controllers detected during a filtering window;
   time-filtering contents of the periodically determined vectors to determine a fault record vector; and
   isolating a fault on the CAN by comparing the fault record vector and a fault signature vector determined based upon a network topology for the CAN.

2. The method of claim 1, wherein isolating a fault on the CAN comprises isolating a fault associated with one of a communications link, a power link and a ground link of the CAN.

3. The method of claim 1, wherein time-filtering contents of the periodically determined vectors to determine a fault record vector comprises time-filtering the periodically determined vectors to determine a fault record vector comprising inactive ones of the controllers.

4. The method of claim 3, wherein time-filtering the periodically determined vectors to determine a fault record vector comprising inactive ones of the controllers comprises time-filtering the periodically determined vectors to determine a fault record vector comprising ones of the CAN controllers that fail to send a message on the CAN during one of the filtering windows.

5. The method of claim 1, wherein periodically determining vectors, each vector comprising inactive ones of the controllers detected during a filtering window comprises detecting as inactive any of the CAN controllers that fails to send a message on the CAN during a complete one of the filtering windows.

6. The method of claim 1, wherein isolating a fault on the CAN by comparing the fault record vector and a fault signature vector determined based upon a network topology for the CAN comprises:
   isolating a fault on the CAN by comparing a set of controllers contained in the fault record vector and a plurality of fault signature vectors; and
   isolating the fault on the CAN based upon correspondence between the set of controllers contained in the fault record vector and a set of controllers contained in one of the fault signature vectors.

7. The method of claim 1, wherein comparing the fault record vector and a fault signature vector determined based upon a network topology for the CAN comprises comparing the fault record vector and a fault signature vector determined based upon a reachability analysis of the network topology for the CAN.

8. Method for monitoring a controller area network (CAN) including a plurality of CAN elements comprising a communication bus and a plurality of controllers, comprising:
   periodically determining vectors, each vector comprising inactive ones of the controllers detected during a filtering window;
   determining a fault record vector based upon results associated with a time-filtering of successive ones of the vectors;
   isolating a fault on the CAN by comparing the fault record vector and a plurality of fault signature vectors associated with a network topology for the CAN.

9. The method of claim 8, wherein isolating a fault on the CAN comprises isolating a fault associated with one of a communications link, a power link and a ground link of the CAN.

10. The method of claim 8, wherein determining a fault record vector based upon results associated with a time-filtering of successive ones of the vectors comprises time-filtering the successive ones of the vectors to determine a fault record vector comprising inactive ones of the controllers.

11. The method of claim 10, wherein time-filtering the successive ones of the vectors to determine a fault record vector comprising inactive ones of the controllers comprises time-filtering the successive ones of the vectors to determine a fault record vector comprising ones of the CAN controllers that fail to send a message on the CAN during a complete one of the filtering windows.

12. The method of claim 8, wherein periodically determining vectors, each vector comprising inactive ones of the controllers detected during a filtering window comprises detecting as inactive any of the CAN controllers that fails to send a message on the CAN during a complete one of the filtering windows.

13. The method of claim 8, wherein isolating a fault on the CAN by comparing the fault record vector and a fault signature vector determined based upon a network topology for the CAN comprises:
   isolating a fault on the CAN by comparing a set of controllers contained in the fault record vector and a plurality of fault signature vectors; and isolating the fault on the CAN based upon correspondence between the set of controllers contained in the fault record vector and a set of controllers contained in one of the fault signature vectors.

14. The method of claim 8, wherein comparing the fault record vector and a fault signature vector determined based upon a network topology for the CAN comprises comparing the fault record vector and a fault signature vector determined based upon a reachability analysis of the network topology for the CAN.

15. Method for isolating a fault in a controller area network (CAN), comprising:
 identifying each of a plurality of controllers configured to communicate on the CAN as active or inactive based upon a capability to send a message on the CAN during a present filtering window;
 isolating a fault on the CAN by comparing a fault record vector comprising the identified inactive controllers and a plurality of fault signature vectors determined based upon a reachability analysis of a network topology for the CAN.

16. The method of claim 15, comprising identifying one of the controllers as active when said controller successfully sends a message on the CAN during the present filtering window.

17. The method of claim 15, wherein identifying each controller as inactive based upon a capability to send a message on the CAN during the present filtering window comprises identifying one of the controllers as inactive when said controller has failed to send a message on the CAN during an entire period of a previous filtering window.

18. The method of claim 15, further comprising expanding the filtering window to include the previous filtering window when a previously inactive controller reactivates prior to isolating the fault on the CAN.

19. The method of claim 15, further comprising delaying said isolating the fault on the CAN until an end of a subsequent filtering window upon identifying one of the controllers as inactive during the present filtering window.

* * * * *